United States Patent
Hansen et al.

(10) Patent No.: US 7,324,785 B2
(45) Date of Patent: Jan. 29, 2008

(54) TRANSMIT POWER CONTROL OF WIRELESS COMMUNICATION DEVICES

(75) Inventors: Christopher J. Hansen, Sunnyvale, CA (US); Joonsuk Kim, Menlo Park, CA (US); Matthew Fischer, Mountain View, CA (US); Rajugopal Gubbi, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 1006 days.

(21) Appl. No.: 09/997,938

(22) Filed: Nov. 30, 2001

(65) Prior Publication Data

US 2002/0090966 A1 Jul. 11, 2002

Related U.S. Application Data

(60) Provisional application No. 60/260,982, filed on Jan. 11, 2001.

(51) Int. Cl.
*H04B 1/00* (2006.01)

(52) U.S. Cl. .......................... 455/69; 455/522

(58) Field of Classification Search ............. 455/69, 455/522, 68, 115.1, 102, 115.3, 343, 126, 455/103, 67.11, 67.1, 115, 513, 515, 134, 455/161.3, 226.1, 2

See application file for complete search history.

(56) References Cited

U.S. PATENT DOCUMENTS

| 5,144,296 A * | 9/1992 | DeLuca et al. ............. 340/7.35 |
| 5,732,077 A * | 3/1998 | Whitehead .................. 370/349 |
| 6,212,364 B1 * | 4/2001 | Park ........................... 455/69 |
| 7,085,580 B1 * | 8/2006 | Eibling et al. .............. 455/522 |

* cited by examiner

*Primary Examiner*—Tu Nguyen
(74) *Attorney, Agent, or Firm*—Garlick, Harrison & Markison; James A. Harrison

(57) ABSTRACT

A method and apparatus for controlling transmit power of a wireless communication device includes processing that begins when a transmitting wireless communication device transmits a packet to a targeted wireless device via a wireless channel of a communication system at a $1^{st}$ power level. The processing continues by having the targeted wireless device determining signal strength of the packet received via the wireless channel. The processing then continues when the targeted and/or transmitting device determines the adequacy of the $1^{st}$ power level based on the determined signal strength. If the $1^{st}$ power level is adequate, the transmitting wireless device continues to transmit information at the $1^{st}$ power level. If, however, the $1^{st}$ power level is not adequate, the transmitting communication device adjusts its transmit power up or down to provide an adequate power level.

29 Claims, 8 Drawing Sheets

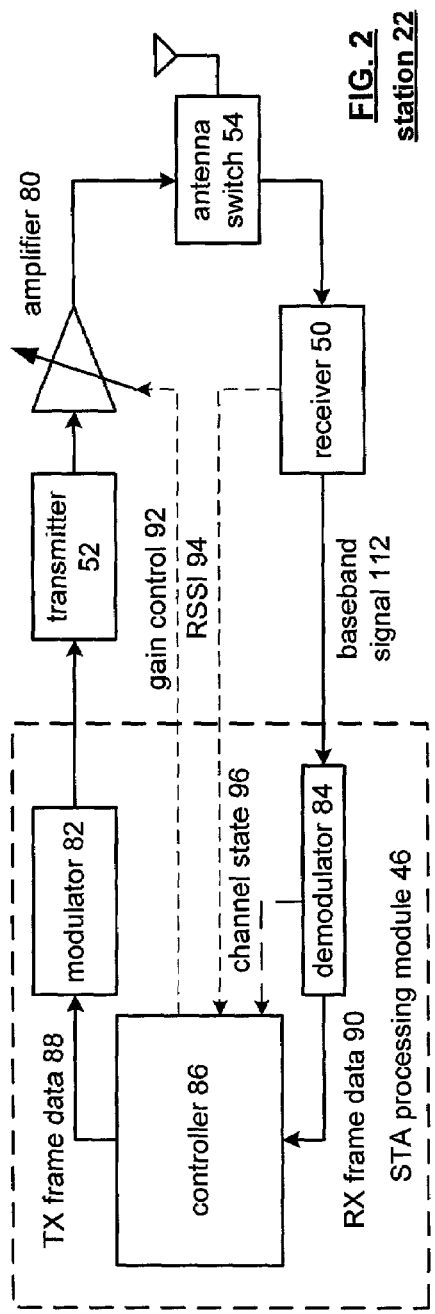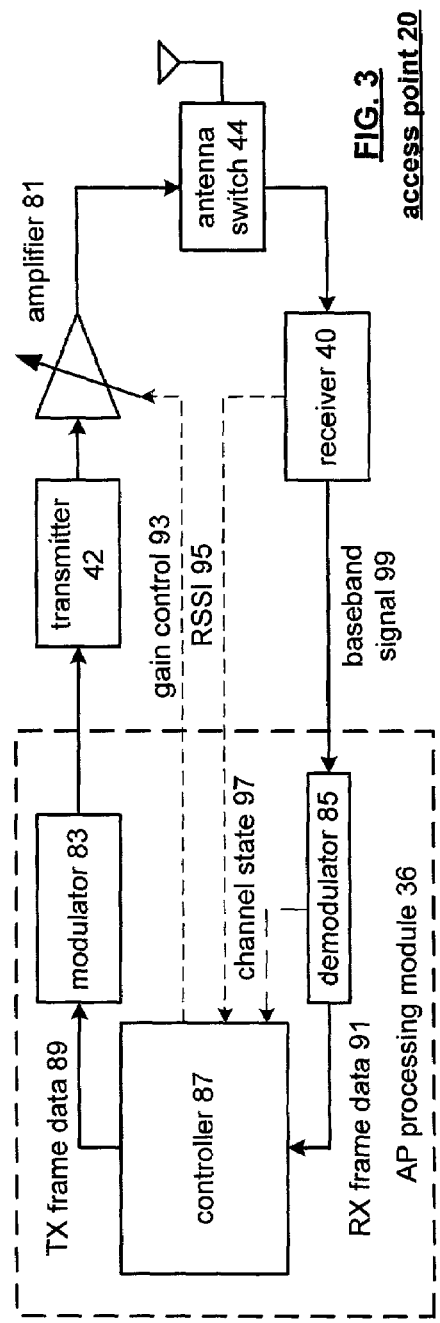

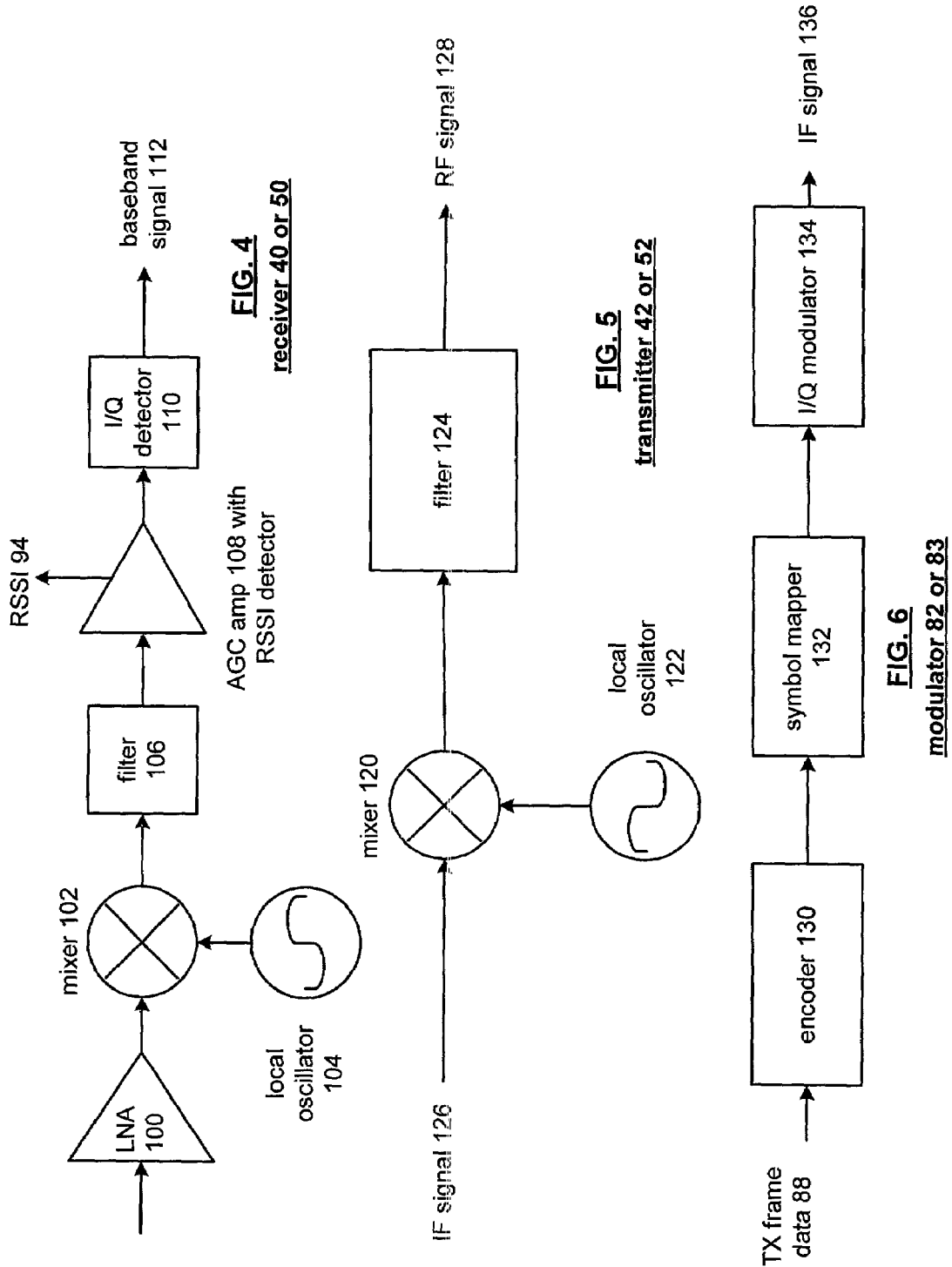

demodulator 84 or 85 controller 86 or 87

TRANSMIT POWER CONTROL OF WIRELESS COMMUNICATION DEVICES

The present U.S. Utility Patent Application claims priority pursuant to 35 U.S.C. § 119(e) to the following U.S. Provisional Patent Application which is hereby incorporated herein by reference in its entirety and made part of the present U.S. Utility Patent Application for all purposes:
1. U.S. Provisional Application Ser. No. 60/260,982, entitled "Transmitter Power Control for Wireless Local Area", filed Jan. 11, 2001, expired.

TECHNICAL FIELD OF THE INVENTION

This invention relates generally to wireless communication systems and more particularly to transmit power control of wireless communication devices within such wireless communication systems.

BACKGROUND OF THE INVENTION

Wireless communication systems are known to support wireless communications between wireless communication devices affiliated with the system. Such wireless communication systems range from national and/or international cellular telephone systems to point-to-point in-home wireless networks. Each type of wireless communication system is constructed, and hence operates, in accordance with one or more standards. Such wireless communication standards include, but are not limited to IEEE 802.11, Bluetooth, advanced mobile phone services (AMPS), digital AMPS, global system for mobile communications (GSM), code division multiple access (CDMA), wireless application protocols (WAP), local multi-point distribution services (LMDS), multi-channel multi-point distribution systems (MMDS), and/or variations thereof.

An IEEE 802.11 compliant wireless communication system includes a plurality of wireless communication devices (e.g., laptops, personal computers, personal digital assistants, et cetera coupled to a station) and may further include a plurality of access points. If the IEEE 802.11 wireless communication system does not include access points, then the wireless communication devices employ an independent basic service set (IBSS) to facilitate point-to-point communications. If the IEEE 802.11 wireless communication system includes access points, the access points provide a basic service set (BSS) for wireless communication devices within the coverage area of the access points. For both IBSS and BSS type of communications, the transmitting device (e.g., a station or access point) transmits at a fixed power level regardless of the distance between the transmitting device and a targeted device (e.g., station or access point). Typically, the closer the transmitting device is to the targeted device, the less error there will be in the reception of the transmitted signal. However, as is generally understood in the art, wireless transmissions may include some error and still provide an accurate transmission. Thus, transmitting at power levels that provide too few errors is energy inefficient.

As is also generally understood in the art, transmissions by one wireless communication device interfere to some degree with transmissions of other wireless communication devices. The level of interference is dependent, at least in part, on the transmit power of the interfering device or devices. Accordingly, cell patterns are employed by wireless communication systems to minimize interference from BSS to BSS, however, some adjacent channel interference may still be present.

Therefore, a need exists for a method and apparatus that adjusts transmit power of wireless communication devices to improve power efficiency, to reduce interference, and/or to meet regulatory requirements.

BRIEF DESCRIPTION OF THE DRAWINGS

FIG. 2 illustrates a schematic block diagram of a station in accordance with the present invention;

FIG. 3 illustrates a schematic block diagram of an access point in accordance with the present invention;

FIG. 4 illustrates a schematic block diagram of a receiver that may be incorporated in a station and/or an access point in accordance with the present invention;

FIG. 5 illustrates a schematic block diagram of a transmitter that may be incorporated in a station and/or an access point in accordance with the present invention;

FIG. 6 illustrates a schematic block diagram of a modulator that may be incorporated in a station and/or an access point in accordance with the present invention;

DETAILED DESCRIPTION OF A PREFERRED EMBODIMENT

Generally, the present invention provides a method and apparatus for controlling transmit power of a wireless communication device. Such a method and apparatus includes processing that begins when a transmitting wireless communication device transmits a packet to a targeted wireless device via a wireless channel of a communication system. The transmitting of the packet is done at a $1^{st}$ power level and is typically done in accordance with a standard to which the communication system is compliant with. The processing continues by having the targeted wireless device determining signal strength of the packet received via the wireless channel. This may be done by determining the receive signal strength indicator, determining signal-to-noise ratio, and/or determining an error rate. The processing then continues when the targeted and/or transmitting device determines the adequacy of the $1^{st}$ power level based on the determined signal strength. The adequacy of the $1^{st}$ power level essentially indicates whether an acceptable level of error (e.g., not too big and not too small) is found in the received packet. If the $1^{st}$ power level is adequate, the transmitting wireless device continues to transmit information at the $1^{st}$ power level. If, however, the $1^{st}$ power level is not adequate, the transmitting communication device adjusts its transmit power up or down to provide an adequate power level. With such a method and apparatus, the power level of a transmitting wireless communication device can be controlled thereby improving efficiency of the wireless communication device and also reducing interference with respect to other communication devices in the communication system.

Figure 1:
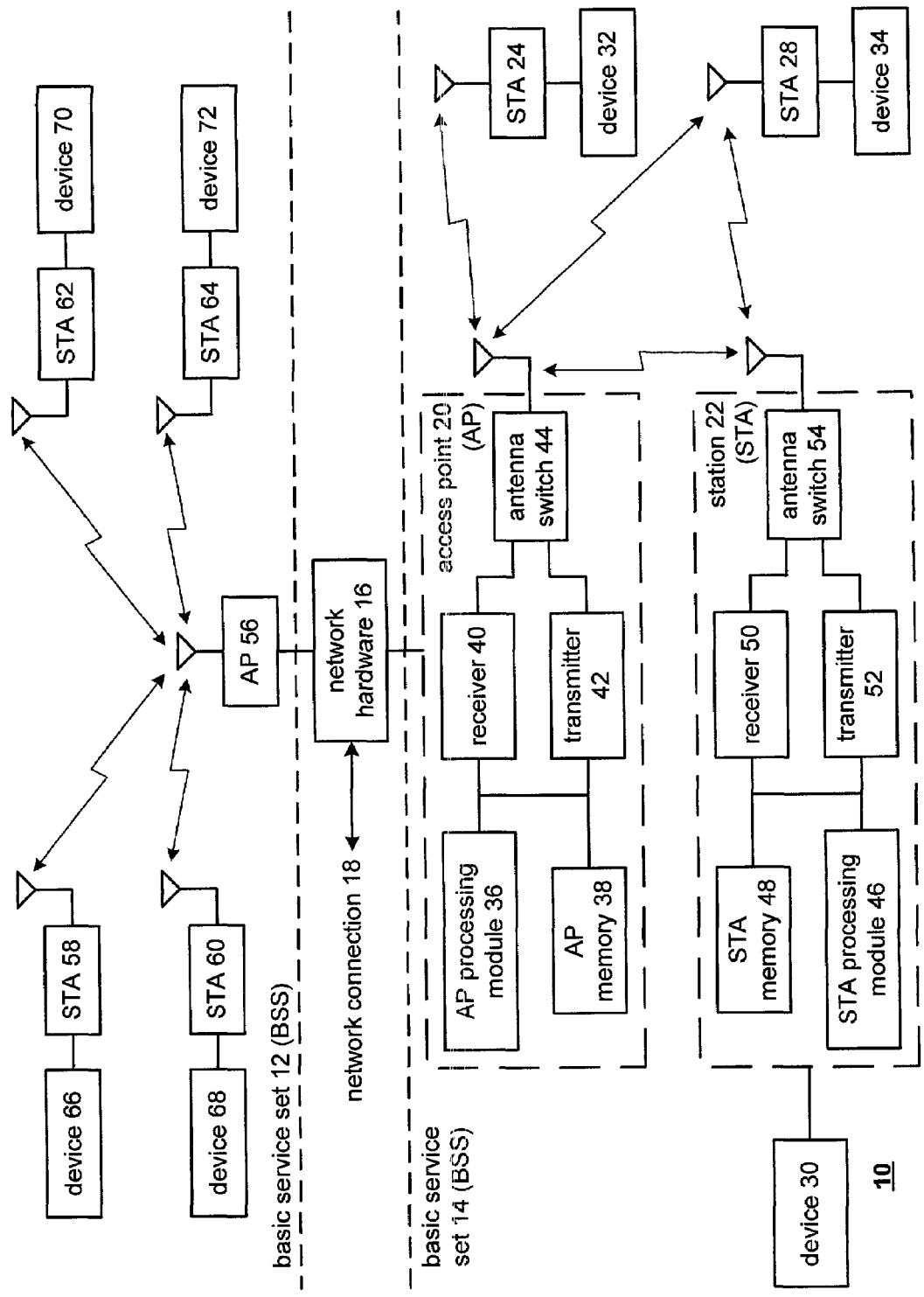
FIG. 1 illustrates a schematic block diagram of a wireless communication system including access points and stations in accordance with the present invention.

The present invention can be more fully described with reference to FIGS. 1 through 12. FIG. 1 illustrates a schematic block diagram of a wireless communication system 10 that includes a plurality of basic service sets (BSS) 12 and 14 and a network hardware component 16. The network hardware component 16 may be a modem, server, computer, and/or any device that provides the wireless communication system 10 connectivity to a network connection 18. As such, the network hardware 16 provides an interface to the Internet, a local area network, a wide area network, et cetera.

Each of the basic service sets 12 and 14 includes an access point 20 and 56, and a plurality of wireless communication devices. Each wireless communication device includes a device and a corresponding station. For example, the basic service set 14 is shown to include station 24 and corresponding device 32, station 28 and corresponding device 34, and station 22 with corresponding device 30. Basic service set 12 is shown to include station 58 with corresponding device 66, station 60 with corresponding device 68, station 62 with corresponding device 70, and station 64 with corresponding device 72. Each of the devices 30-34 and 66-72 may be personal computers, laptops, home entertainment systems, personal digital assistants, and/or any other device that may communicate via a radio frequency transmission path with other such devices and/or with the Internet, local area network and/or wide area network connection.

Each of the stations 22-28 and 58-64 includes (as depicted in station 22) an antenna switch 54, a receiver 50, a transmitter 52, station memory 48, and a station processing module 46. The station processing module 46 may be a single processing device or a plurality of processing devices. Such a processing device may be a microprocessor, microcontroller, digital signal processor, field programmable gate array, programmable logic device, logic circuitry, state machine, analog circuitry, digital circuitry, and/or any device that manipulates signals (analog and/or digital) based on operational instructions. The station memory 48 may be a single memory device or a plurality of memory devices. Such a memory device may be read-only memory, random access memory, volatile memory, non-volatile memory, flash memory, static memory, dynamic memory, and/or any device that stores digital information. Note that when the processing module 46 implements one or more of its functions via a state machine, logic circuitry, analog circuitry, and/or digital circuitry, the memory storing the corresponding operational instruction will be embedded in the circuitry comprising the state machine, logic circuit, analog circuit, and/or digital circuit. The operations performed by the processing module 46 and stored in memory 48 will be graphically discussed, at least in part, with reference to FIGS. 2 through 12.

Each device 30-34 and 66-72 may communicate in a point-to-point manner with other devices via its corresponding station and/or with its corresponding access point. The corresponding access point is the access point within the same basis service set as the device and to which the station is registered. Accordingly, each device 30-34 and 66-72 may transmit and/or receive data via its corresponding station.

To transmit data, the corresponding device, for example device 30, provides a frame of data to the station processing module 46. As will be described in greater detail with reference to the FIGS. 2, 8 and 9 through 12, the station processing module 46 modulates the data and provides it to the transmitter 52. The transmitter 52 up-converts the frequency of the transmit data to an RF frequency that is provided to the antenna switch 54. The antenna switch 54 provides the RF signal to the antenna for transmission to either the access point 20 or to another station within the basic service set 14. As part of the processing performed by the station processing module 46, the transmit power level utilized by transmitter 52 is determined to provide an efficient transmission of the RF signal to improve efficiency of the transmitter 52 and also to minimize interference on other stations within the same basic service set and with stations in other basic service sets. The details of determining the various power levels will be described in greater detail with reference to FIGS. 2 through 12.

Device 30 may also receive data via its corresponding station 22 from access point 20 or another station. In this instance, the station 22, via its antenna receives an RF signal and, through antenna switch 54, provides it to receiver 50. Receiver 50 down-converts the RF signal to a base-band signal and provides the base-band signal to the station processing module 46, which demodulates the base-band signal to recapture a packet of data. The packet of data is provided to device 30.

Access point 20 includes an antenna switch 44, a receiver 40, a transmitter 42, an access point (AP) processing module 36 and an access point (AP) memory 38. The AP processing module 36 may be a single processing device or a plurality of processing devices. Such a processing device may be a microprocessor, microcontroller, digital signal processor, field programmable gate array, programmable logic device, logic circuitry, state machine, analog circuitry, digital circuitry, and/or any device that manipulates signals (analog and/or digital) based on operational instructions. The AP memory 38 may be a single memory device or a plurality of memory devices. Such a memory device may be read-only memory, random access memory, volatile memory, non-volatile memory, flash memory, static memory, dynamic memory, and/or any device that stores digital information. Note that when the processing module 46 implements one or more of its functions via a state machine, logic circuitry, analog circuitry, and/or digital circuitry, the memory storing the corresponding operational instruction will be embedded in the circuitry comprising the state machine, logic circuit, analog circuit, and/or digital circuit. The operations performed by the processing module 36 and stored in memory 38 will be discussed, at least in part, with reference to FIGS. 2 through 12.

The access point 20 coordinates the transmission of data to and from stations within its basic service set and also coordinates the transmission of data to and from the network hardware 16. For example, access point 20 may receive a packet from any one of the stations 22, 24 or 28 and provide it via antenna switch 44 to receiver 40. Receiver 40 converts the packet from a RF signal to a base-band signal. The receiver then provides the base-band signal to the access point processing module 36. The access point processing module 36 processes the receive packet to determine its destination (e.g., to the network hardware 16 or to another station within the basic service set). In addition, the access point processing module 36 determines the signal strength of the received signal. The access point processing module 36 provides the recaptured packet either to the network hardware 36 or to transmitter 42 for transmission to a station within the basic service set. In addition, the processing module 36 may also provide the received signal strength indication to the transmitter for transmission back to the transmitting station or may provide an adjust power level signal to the station.

The transmitter 42, if transmitting a packet to a destination station, up-converts a base-band signal packet to an RF signal. The RF signal is transmitted via the antenna switch 44 and the corresponding antenna to the targeted station. The receive signal strength indication of the received packet or the power level adjust signal may be included within the packet. As one of average skill in the art will appreciate, if the BSS operates based on a carrier sense multiple access with collision avoidance (CSMA/CDA), each station in the BSS will receive the RF signal, but only the station that is addressed, i.e., the target station, will process the RF signal to recapture the packet.

Upon receiving the signal strength indication, the station that transmitted the packet determines whether its power level used to transmit the packet is acceptable. In general, the station is determining whether the transmit power was not too high (e.g., not producing enough errors) or not too low (e.g., producing too many errors). In either case, the station would then adjust its power level to ensure that the received packets included an acceptable number of errors at or near an error threshold enabling the recipient to accurately retrieve the corresponding data.

Alternatively, when the access point 20 provides the new power level setting to the station, the station adjusts it transmit power accordingly. Note that the access point determines the need for a power level change by the station using a similar process as the station would if it were making the determination. In general, the access point determines the adequacy of that particular power level by determining whether the current power level is too high (e.g., does not produce enough error) or is too low (e.g., produces too many errors). If the power level is not adequate, the access point determines an appropriate power level to provide an acceptable level of errors.

Similarly, a station receiving a packet from an access point may provide the receive signal strength indication back to the access point or the station may determine and indicate the new power level setting for the access point when transmitting to this station. In either case, the access point adjusts its power level based on determined made from the received signal strength or in response to the change power level indication from the station. The details of determining the adequacy of the power level will be described in greater detail with reference to FIGS. 2 through 12.

FIG. 2 illustrates a schematic block diagram of station 22 that includes the station processing module 46, transmitter 52, receiver 50, antenna switch 54, and a power amplifier 80. The processing module 46 is configured to provide a modulator 82, controller 86, and demodulator 84. The details of the modulator 82 will be described in greater detail with reference to FIG. 6, the details of demodulator 84 will be described in greater detail with reference to FIG. 7, and the details of controller 86 will be described in greater detail with reference to FIG. 8.

In this configuration, the receiver 50 is operably coupled to receive an RF signal via the antenna switch 54 and to produce a base-band signal 112 therefrom. In addition, the receiver 50, as will be described in greater detail with reference to FIG. 4, determines the received signal strength indication 94 of the incoming RF signal. The receiver 50 provides the RSSI 94 to controller 86.

The demodulator 84 is operably coupled to receive the base-band signal 112 and produce therefrom receive frame data 90 and channel state information 96. The channel state data 96 includes one or more of an interference estimation, channel estimation, and/or decoding error information. In essence, the demodulator 84 performs the inverse function that modulator 82 performed. For example, if modulator 82 performs a binary phase shift keying (BPSK), then the demodulator 84 would perform an inverse binary phase shift keying function.

The controller 86 is operably coupled to receive the RSSI 94, the channel state information 96 and the receive frame data 90. Based on these inputs, the controller 86 determines the adequacy of the power level used to transmit the incoming RF signal. In this case, the controller 86 formats a transmit frame data 88 to include an indication of a new power level and/or the received signal strength indication 94 and channel state information 96. The data 88 is modulated via modulator 82 and subsequently transmitted via transmitter 52 and amplifier 80 to the transmitting station.

The RF signal received via antenna switch 54 may include an indication for power adjustment either from another station or from an access point. The receiver 50 demodulates the information to produce base-band signal 112. The demodulator 84 demodulates the information to recapture data 90. The controller 86, based on the recaptured data 90, determines that the data 90 indicates that the power level is to be adjusted. Based on this information, controller 86 generates a gain control signal 92, which adjusts the gain of amplifier 80.

FIG. 3 illustrates a schematic block diagram of access point 20 that includes the processing module 36, transmitter 42, receiver 40, antenna switch 44 and amplifier 81. The processing module 36 is configured to provide modulator 83, demodulator 85 and controller 87. The details of modulator 83 will be described in greater detail with reference to FIG. 6, the details of demodulator 85 will be described in greater detail with reference to FIG. 7, and the details of controller 87 will be described in greater detail with reference to FIG. 8.

The receiver 40 receives an RF signal via antenna switch 44 and produces a base-band signal 99 and an RSSI indication 95. The demodulator 85 demodulates the base-band signal 99 to produce receive frame data 91 and channel state information 97. Controller 87 is operably coupled to receive the receive frame data 91, the channel state information 97 and the RSSI 95. If the incoming RF signal includes information that requested the access point 20 to adjust its power level, controller 87 interprets this data to produce gain control signal 93. Accordingly, gain control signal 93 causes amplifier 81 to adjust its gain to the requested level.

Alternatively, if the received RF signal corresponds to a packet transmitted by a station, the controller 87 determines the adequacy of the power level used by the station to transmit the packet. If the power level is inadequate, the controller 87 may determine a new power level or provide the RSSI 95 and channel state information 97 to the station within the transmit frame data 89.

FIG. 4 illustrates a schematic block diagram of receiver 40 used in station 22 or receiver 50 used in access point 20. As shown, the receiver includes a low noise amplifier 100, a local oscillator 104, a mixer 102, filter 106, an automatic gain control amplifier 108 with RSSI detection, and an I/Q detector 110. In operation, the low noise amplifier receives an RF signal and amplifies it. The mixer 102 mixes the amplified RF signal and a local oscillation produced by local oscillator 104 to produce an up-converted signal and a down-converted signal. The filter 106 filters the up-converted portion and passes the down-converted portion, which may be directly to base-band or to an intermediate frequency signal that is subsequently down-converted to base-band.

The amplifier 108 amplifies the signal and also determines the RSSI 94 of the inbound signal. Such RSSI determination is known in the art, thus no further discussion of the details of determining the RSSI will be provided except to further illustrate the concepts of the present invention. The I/Q detector 110 processes the output of amplifier 108 to produce the base-band signal 112.

FIG. 5 illustrates a schematic block diagram of transmitter 42 that may be used in access point 20 or transmitter 52 that may be used in station 22. As shown, the transmitter includes a mixer 120, a local oscillator 122, and a filter 124. The mixer 120 is operably coupled to mix an intermediate frequency signal 126, which may be at base-band, with a local oscillation. The output of mixer 120 is an up-converted signal and a down-converted signal. Filter 124 filters the down-converted signal such that the resultant is RF signal 128.

FIG. 6 illustrates a schematic block diagram of modulator 82 or modulator 83. The modulator includes encoder 130, symbol mapper 132 and I/Q modulator 134. If the modulator 82 or 83 is performing BPSK, the encoder 130 encodes the transmit frame data 88 to produce encoded signals. The symbol mapper 132 maps the encoded data to symbols corresponding to BPSK modulated data. The I/Q modulator 134 modulates the mapped data to a $1^{st}$ frequency for $1^{st}$ state mapped data and to a $2^{nd}$ frequency for $2^{nd}$ state mapped data to produce the IF signal 136.

Figure 7:
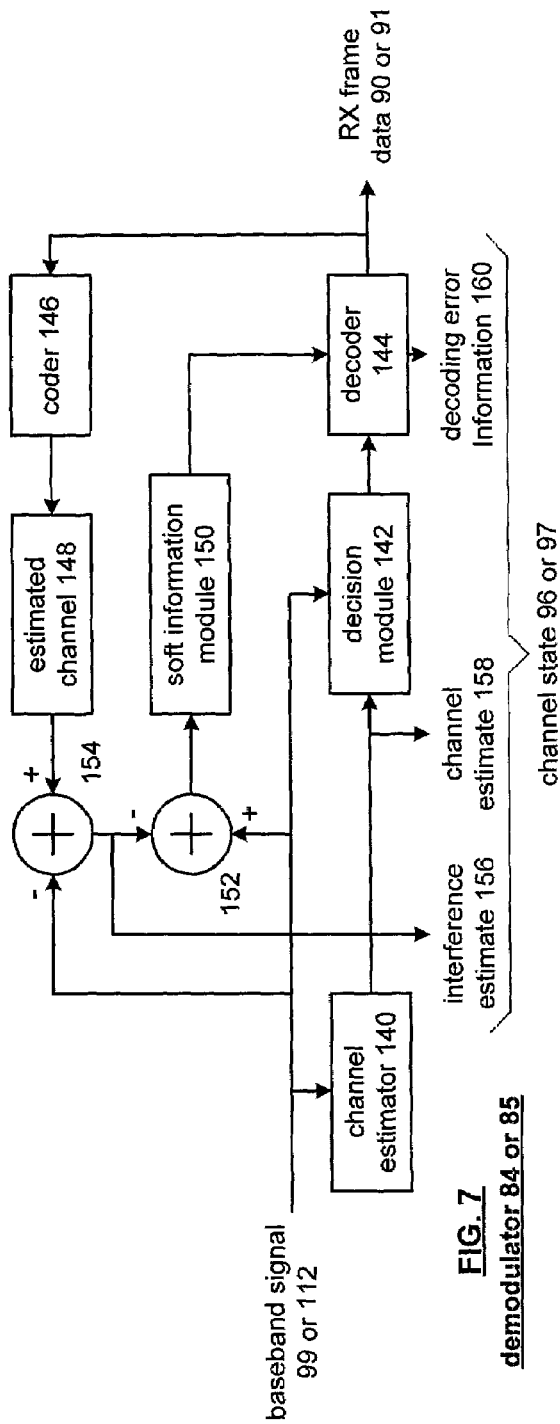
FIG. 7 illustrates a schematic block diagram of a demodulator that may be incorporated in a station and/or an access point in accordance with the present invention.

FIG. 7 illustrates a schematic block diagram of demodulator 84 or demodulator 85 that may be utilized in the station 22 or access point 20, respectively. The demodulator includes a channel estimator 140, summing module 154, summing module 152, decision module 142, decoder 144, soft information module 150, estimated channel module 148 and coder 146.

In operation, a base-band signal 99 or 112 is received by demodulator 84 or 85 and provided to the channel estimator 140, decision module 142 and summing modules 152 and 154. The channel estimator 140, for IEEE 802.11a operations, determines the channel impulse response estimate, i.e., it measures the impulse response it does not choose as a channel. Based on this information, the channel estimator 140 produces a channel estimate information 158. The decision module 142 receives the channel estimate information 158 and the base-band signal 99 or 112. Based on this information, the decision module 142 prepares the base-band signal 99 or 112 for decoding (e.g., provides channel delineation information, phase shift information, et cetera).

The decoder 144 is operably coupled to receive the output of decision module 142 and the output of soft information module 150 and produces therefrom the receive frame data 90 or 91 and decoding error information 160. The soft information module 150 essentially is determining the weighting factor to be applied to the data received from the decision module 140. The weighting factor indicates a confidence level that the incoming data is being accurately received.

The coder 146 encodes the frame data 90 or 91, which is provided to the estimated channel module 148. In essence, coder 146 and estimated channel module 148 are operably coupled to reproduce the base-band signal 99 or 112 based on the decoded information. This re-encoded data is used to verify the accuracy of the demodulation process.

Summing module 154 indicates the differences between the actual base-band signal 99 and 112 and the reproduced base-band signal from the channel estimator 148. The result is an interference estimate 156. Summing module 152 sums the interference estimate 156 with the base-band signal 99 or 112 to produce an input for the soft information module 150. Based on this input, the soft information module 150 provides its weighting (i.e., confidence level) of the accuracy and/or ability to accurately recapture the data contained in the base-band signal.

Figure 8:
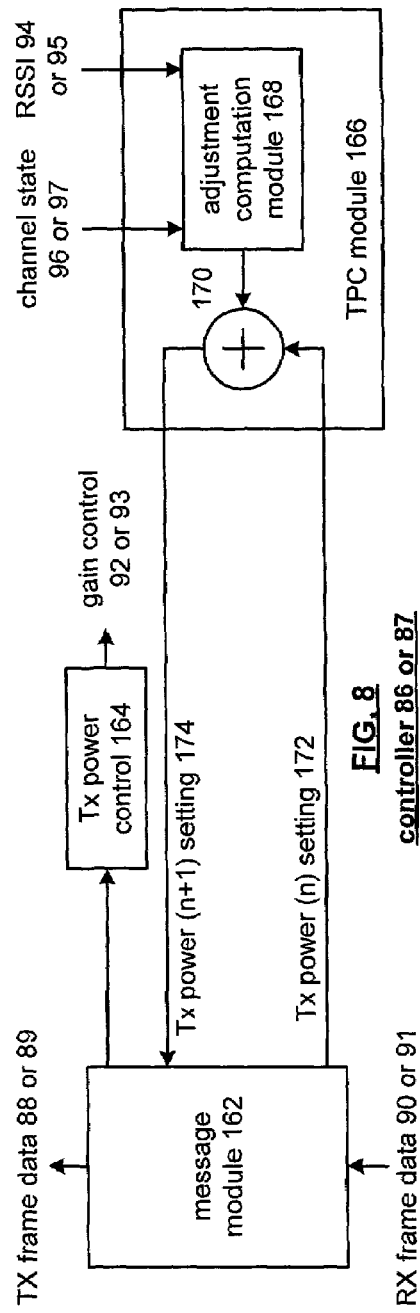
FIG. 8 illustrates a schematic block diagram of a controller that may be incorporated in a station and/or an access point in accordance with the present invention.

FIG. 8 illustrates a schematic block diagram of controller 86 or controller 87 that may be incorporated in station 22 or access point 20, respectively. The controller includes a message module 162, transmit power controller 164, and a transmit power control module 166. The transmit power control module 166 includes an adjustment compensation module 168 and a summing module 170. The message module 162 is operably coupled to receive the receive frame data 90 or 91 and to extract therefrom the current power setting 172. The message module 162 provides the current power setting 172 to the transmit power control module 166.

The adjustment computation module 168, based on channel state information 96 or 97 and RSSI 94 or 95, determines whether the current power setting 172 is adequate. Such a determination will be described in greater detail with reference to FIGS. 9 through 12. If the adjustment compensation module 168 determines that the current power setting 172 needs to be adjusted, it provides an increment or decrement signal to summing module 170. Summing module 170 sums the current power setting 172 with the output of adjustment compensation module 168 to produce a new power setting 174. Note the power adjustment may be based on the equation $p(n+1)=p(n)w[\gamma_{req}/\gamma_{est}]$, where (n+1) is the transmit power level after updating, p(n) is the transmit power before updating, w is the weighting factor, $\gamma_{req}$ is the required signal to interference ratio (or signal to noise ratio if the received interference is less than the noise power) and $\gamma_{est}$ is the current estimate of the signal to interference ratio (or the current signal to noise ratio if the received interference is less than the noise power). Note that $\gamma_{est}$ may be computing using a geometric mean of the signal to interference ratio (SIR) on each sub-carrier of the received frame. Alternatively, $\gamma_{est}$ may be computing by the lowest SIR over all sub-carriers, an arithmetic average over all sub-carriers, and/or a geometric or arithmetic average over all sub-carriers with an SIR level over a threshold. The values for $\gamma_{req}$ are the level required to achieve a bit error rate of approximately 10-6 with equal received power on each sub-carrier and additive white gaussian noise at the receiver. The weighting factor can range from 1 to 100, depending on the desired safety margin.

The message module 162 receives the new power setting 174 and packetizes it into the transmit frame data 88 or 89. The message module 162 is further operably coupled to extract new power settings from the receive frame data 90 or 91. In this instance, the message module 162 interprets the frame data 90 or 91 to determine a new power setting. The message module 162 provides this information to the transmit power controller 164, which generates the gain control signal 92 or 93.

Figure 9:
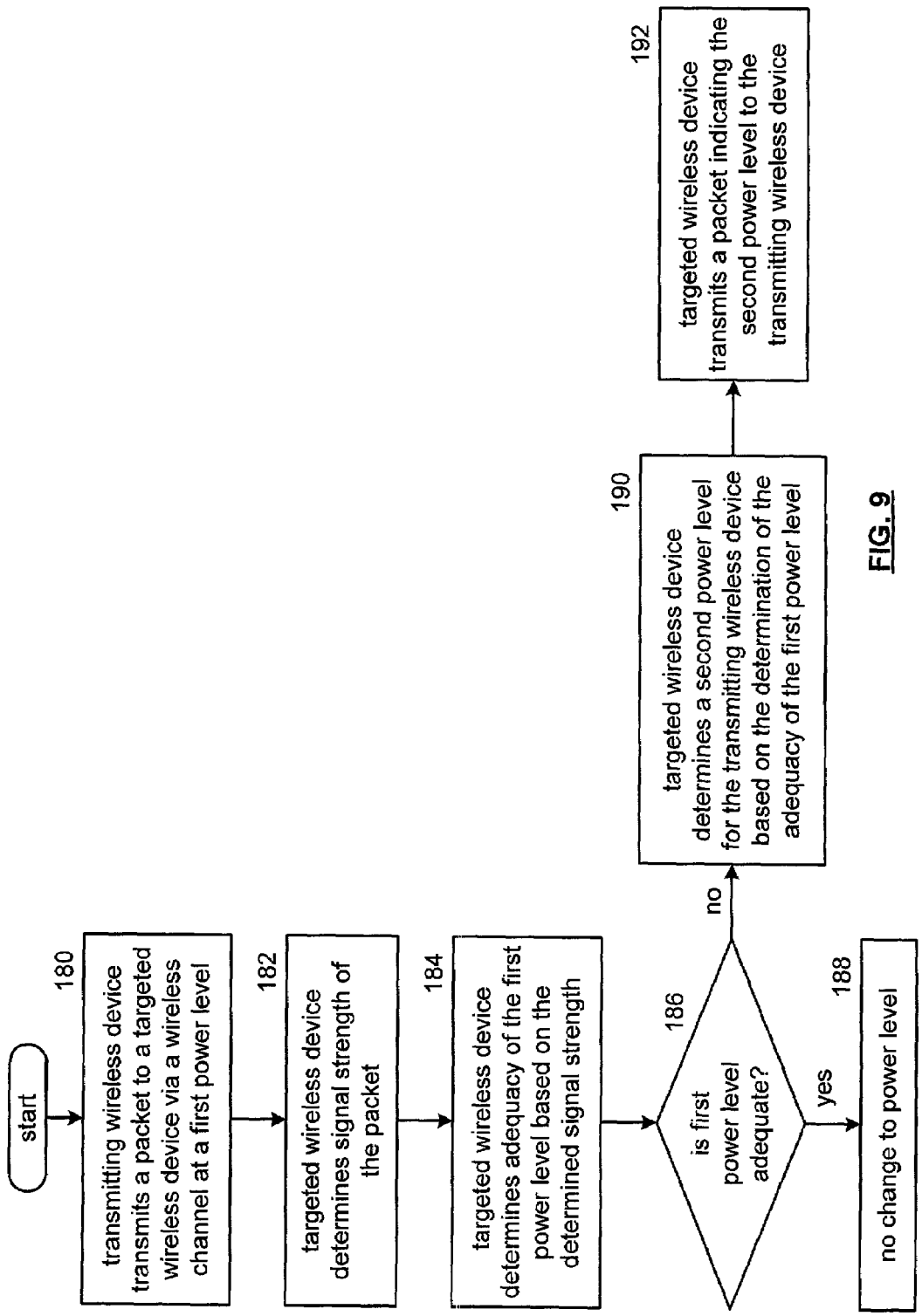
FIG. 9 illustrates a logic diagram of a method for controlling transmit power of a wireless communication device in accordance with the present invention.

FIG. 9 illustrates a logic diagram of a method for controlling transmit power of a wireless device in a wireless communication system. The process begins at Step 180 where a transmitting wireless device transmits a packet to a targeted wireless device via a wireless channel at a $1^{st}$ power level. For example, the transmitting wireless device may be a station and the targeted wireless device may be an access point. Alternatively, the transmitting wireless device may be one station and the targeted wireless device may be another station. As a still further alternative, the transmitting wireless device may be an access point and the targeted wireless device may be a station.

The process then proceeds to Step 182 where the targeted wireless device determines signal strength of the received packet to produce a determined signal strength. This may be done by calculating the RSSI, SNR, and/or any other mechanism for determining signal to noise and/or interference ratios. The process then proceeds to Step 184 where the targeted wireless device determines adequacy of the $1^{st}$ power level based on the determined signal strength. This will be described in greater detail with reference to FIG. 10.

The process then proceeds to Step 186 where the targeted wireless device determines whether the $1^{st}$ power level is adequate. If so, the process proceeds to Step 188 where no change to the power level is indicated, which may or may not be transmitted to the transmitting wireless device.

If the $1^{st}$ power level is not adequate, the process proceeds to Step 190. At Step 190, the targeted wireless device determines a $2^{nd}$ power level for the transmitting wireless device based on the determination of the adequacy of the $1^{st}$ power level. This will be described in greater detail with reference to Steps 218 and 220 of FIG. 10. The process then proceeds to Step 192 where the targeted wireless device transmits a packet indicating the $2^{nd}$ power level to the transmitting wireless device. Upon receiving the packet indicating the $2^{nd}$ power level, the transmitting wireless device provides an acknowledgment of receipt to the targeted wireless device. In addition, or alternatively to, the transmitting wireless device in response to receiving the packet indicating the $2^{nd}$ power level, may provide an indication that it has adjusted its power level to the indicated $2^{nd}$ power level.

Figure 10:
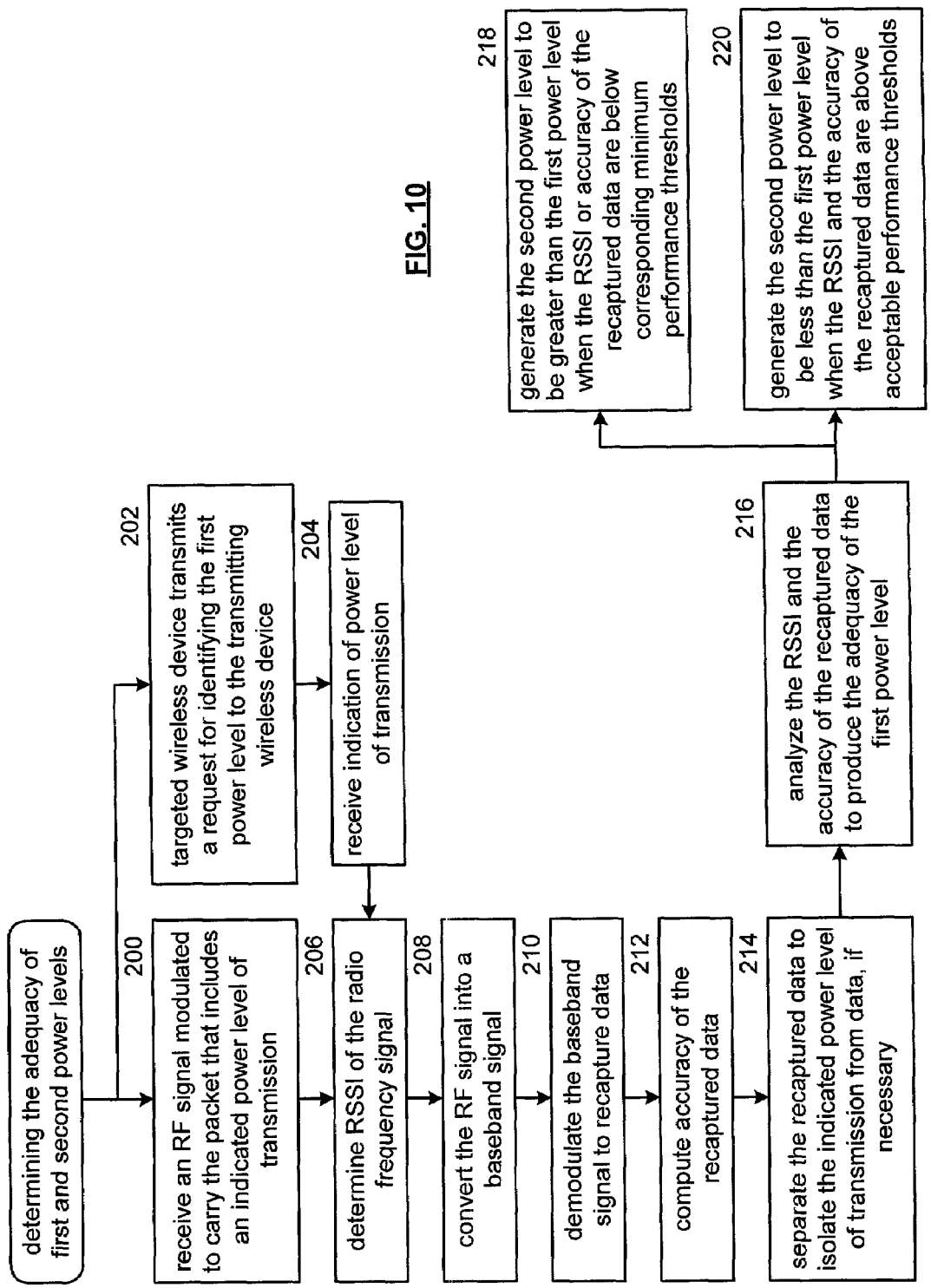
FIG. 10 illustrates a logic diagram of a method that further defines Step 184 of FIG. 9.

FIG. 10 illustrates a logic diagram that further describes the determination of the adequacy of the $1^{st}$ and $2^{nd}$ power levels. The processing begins at Step 200 or at Step 202. At Step 200, the targeted wireless device receives a RF signal that has been modulated to carry the packet that includes an indication of the power level of transmission (e.g., indicates the $1^{st}$ power level). Alternatively, at Step 202, the targeted wireless device, in response to receiving a packet, requests identity of the $1^{st}$ power level from the transmitting wireless device. At Step 204, the indication of the power level of transmission (i.e., an indication of the $1^{st}$ power level) is received.

The process then proceeds to Step 206 where the targeted wireless device determines the receive signal strength indication (RSSI) of the RF signal. The process then proceeds to Step 208 where the targeted wireless device converts the RF signal into a base-band signal. The process then proceeds to Step 210 where the targeted wireless device demodulates the base-band signal to recapture the data of the packet. The process then proceeds to Step 212 where the targeted wireless device computes the accuracy of the recaptured data by determining the error rate of the data. In addition, for BPSK transmissions, the "clouds" of actual received data with respect to ideal received data is reviewed to determine its size and potential overlap. If the size of the clouds is relatively small and there is no overlap, the error rate may be too small. Conversely, if the clouds are too large and nearly overlap, the error rate is too great.

The process then proceeds to Step 214 where the targeted wireless device separates the recaptured data to isolate the indicated power level from the data if such a process is necessary. For example, the process is not necessary if the indication of the transmitting power was done in accordance with Steps 202 and 204.

The process then proceeds to Step 216 where the targeted wireless device analyzes the receive signal strength indication and the accuracy of the recaptured data to produce the adequacy of the $1^{st}$ power level. The process then proceeds to Steps 218 or 220. At Step 218, the targeted wireless device generates the $2^{nd}$ power level to be greater than the $1^{st}$ power level when the RSSI or the accuracy of the recaptured data is below corresponding minimal performance thresholds. For example, if the RSSI is too low or there are too many errors in the recaptured data, the power level may need to be increased.

At Step 220, the targeted wireless device generates the $2^{nd}$ power level to be less than the $1^{st}$ power level when the RSSI and the accuracy of the recaptured data are above acceptable performance thresholds. For instance, if there are too few errors in the recapturing of the data and the RSSI is above acceptable limits, the power level may be reduced.

Figure 11:
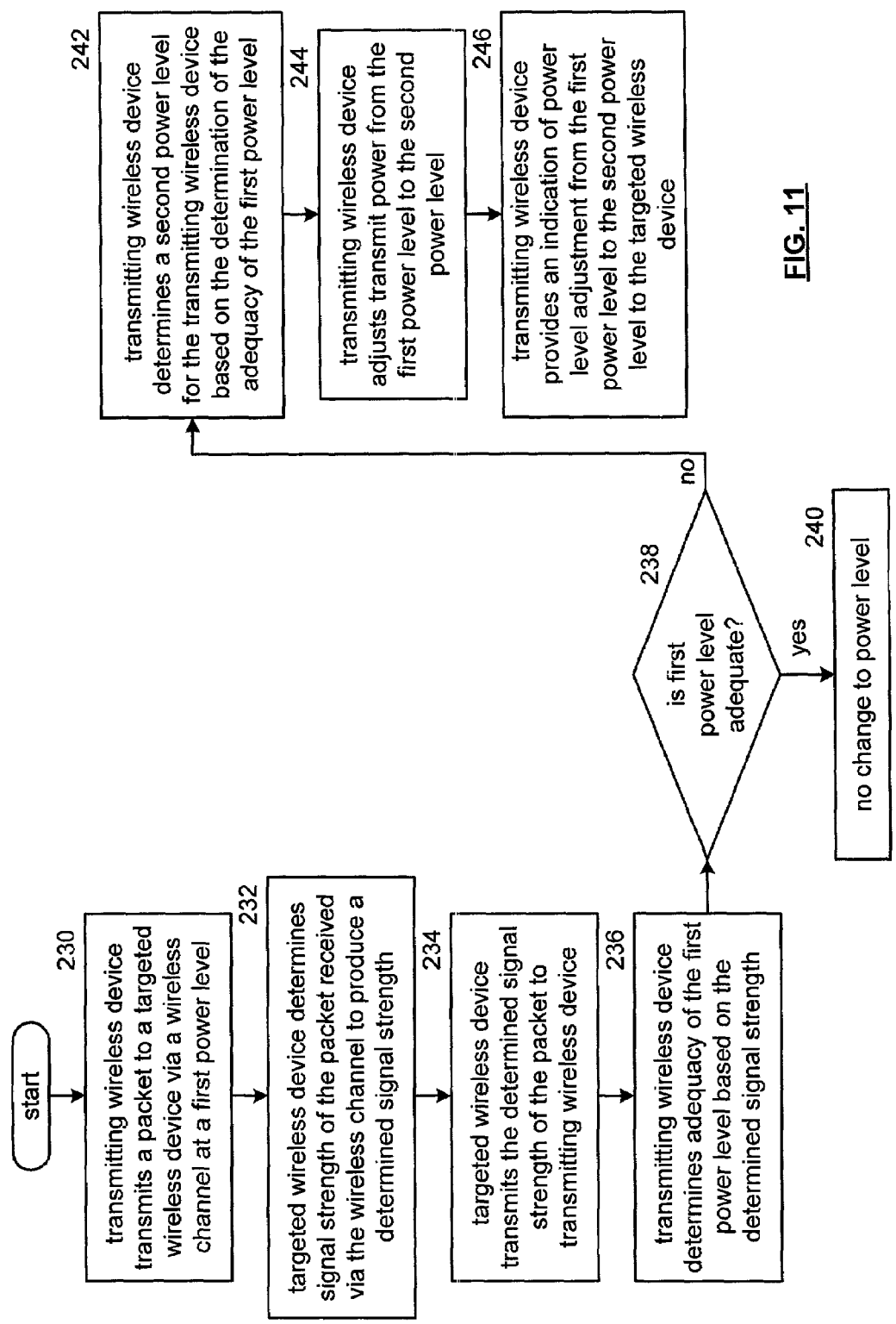
FIG. 11 illustrates a logic diagram of an alternate method for controlling transmit power of a wireless communication device in accordance with the present invention.

FIG. 11 illustrates a logic diagram of an alternate method for controlling transmit power of a wireless device in a wireless communication system. The process begins at Step 230 where a transmitting wireless device transmits a packet to a targeted wireless device via a wireless channel at a $1^{st}$ power level. The process then proceeds to Step 232 where the targeted wireless device determines signal strength of the packet received to produce a determined signal strength.

The process then proceeds to Step 234 where the targeted wireless device transmits the determined signal strength of the packet to the transmitting wireless device. In addition, the targeted wireless device may also provide an error rate indication of recapturing the data to the transmitting wireless device. The process then proceeds to Step 236 where the transmitting wireless device determines adequacy of the $1^{st}$ power level based on the determined signal strength (e.g., RSSI and/or error rate of recapturing the data).

The process then proceeds to Step 238 where the transmitting wireless device determines whether the $1^{st}$ power level is adequate. If so, the process proceeds to Step 240 and no change to the power level is made. If, however, the $1^{st}$ power level is not adequate, the process proceeds to Step 242.

At Step 242, the transmitting wireless device determines a $2^{nd}$ power level for itself based on the determination of the adequacy of the $1^{st}$ power level. The process then proceeds to Step 244 where the transmitting wireless device adjusts its transmit power from the $1^{st}$ power level to the $2^{nd}$ power level. The process then proceeds to Step 246 where the transmitting wireless device provides an indication of power level adjustment to the targeted wireless device.

Figure 12:
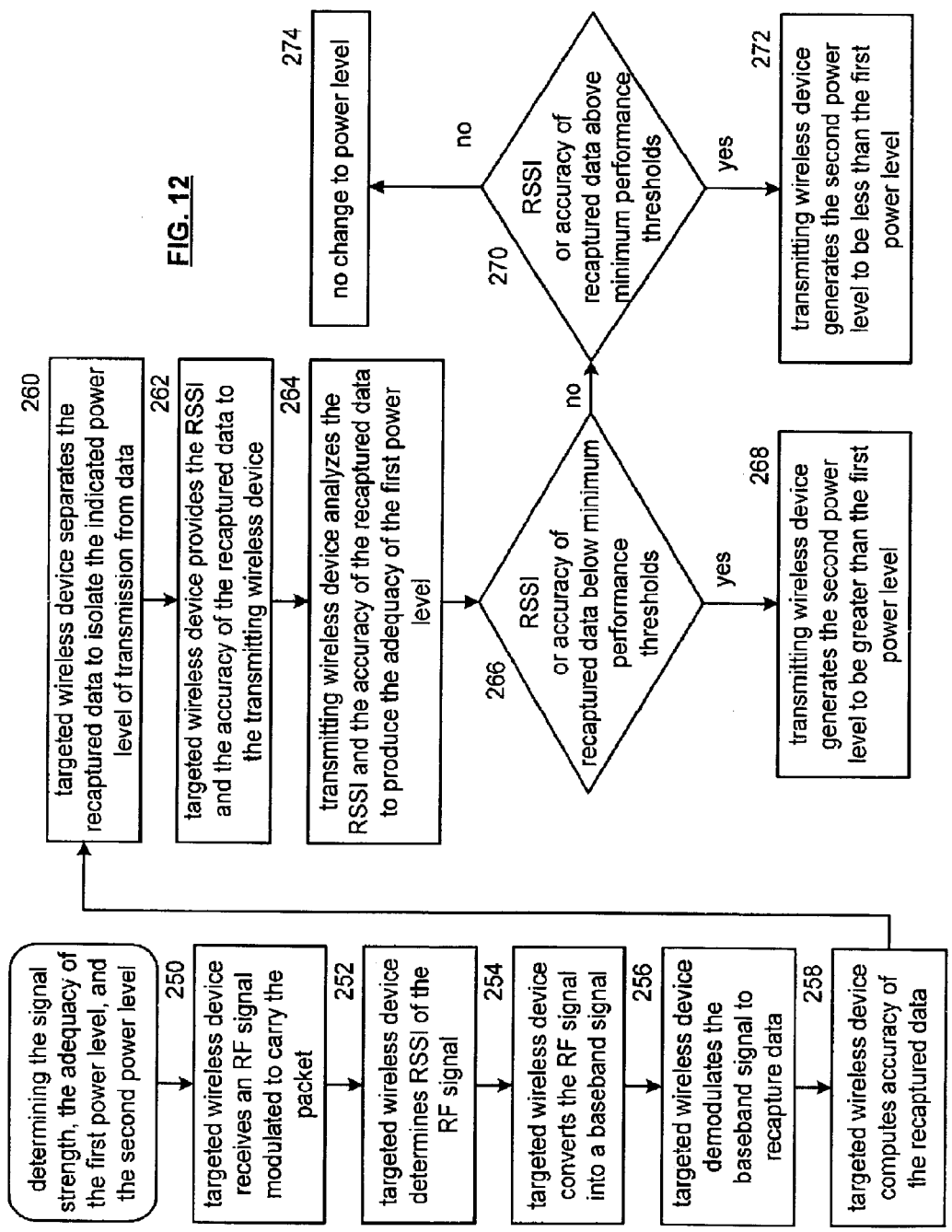
FIG. 12 illustrates a logic diagram of a method that further describes Steps 232, 234 and 236 of FIG. 11.

FIG. 12 illustrates a logic diagram of a more detailed method for determining the signal strength, the adequacy of the $1^{st}$ power level, and the adequacy of the $2^{nd}$ power level of the corresponding steps in FIG. 11. The process begins at Step 250 where the targeted wireless device receives a RF signal modulated to carry the packet. The process then proceeds to Step 252 where the targeted wireless device determines the receive signal strength indication of the RF signal. The process then proceeds to Step 254 where the targeted wireless device converts the RF signal into a base-band signal. The process then proceeds to Step 256 where the targeted wireless device demodulates the base-band signal to recapture the data. The process then proceeds to Step 258 where the targeted wireless device computes accuracy of the recaptured data.

The process then proceeds to Step 260 where the targeted wireless device separates the recaptured data to isolate the indicated power level of transmission from the data. The process then proceeds to Step 262 where the targeted wireless device provides the RSSI and the accuracy of the recaptured data to the transmitting wireless device. The process then proceeds to Step 264 where the transmitting wireless device analyzes the RSSI and the accuracy of the recaptured data to produce the adequacy of the $1^{st}$ power level.

The process then proceeds to Step 266 where the transmitting wireless device determines whether the RSSI or the accuracy of the recaptured data is below minimum performance thresholds. If so, the process proceeds to Step 268 where the transmitting wireless device generates the $2^{nd}$ power level to be greater than the $1^{st}$ power level. If not, the process proceeds to Step 270 where the transmitting wireless device determines whether the RSSI or accuracy of the recaptured data is above minimum performance thresholds. If so, the process proceeds to Step 272 where the transmitting wireless device generates the $2^{nd}$ power level to be less than the $1^{st}$ power level. If not, the process proceeds to Step 274 where the transmitting wireless device makes no change to its power level.

The preceding discussion has presented a method and apparatus for adjusting the transmitting power level for devices within a wireless communication system. Such method and apparatus is particularly useful for wireless communication systems that are designed in accordance with the IEEE 802.11a, b, h, etc. As one of average skill in the art will appreciate, other embodiments may be derived from the teachings of the present invention, without deviating from the scope of the claims.

What is claimed is:

1. A method for transmit power control of transmitting wireless device, the method comprises:
   transmitting, by the transmitting wireless device, a packet to a targeted wireless device via a wireless channel at a first power level;
   determining, by the targeted wireless device, signal strength and decoding error information of the packet received via the wireless channel;
   determining, by the targeted wireless device, whether the signal strength is within an acceptable range of signals strengths;
   determining, by the targeted wireless device, whether the decoding error information is within an acceptable range of error rate;
   transmitting, by the targeted wireless device, a packet indicating the determined signal strength of the received packet to the transmitting wireless device via the wireless channel and a request for a transmitted power; and
   transmitting, by the transmitting wireless device, an indication of the transmitted power level wherein the target wireless device generates a power request indication based upon the received signal carrying the indication of the transmitted power level for the previous transmission.

2. The method of claim 1, wherein the transmitting the packet further comprises:
   transmitting the packet to include an indicated power level of transmission by the transmitting wireless device.

3. The method of claim 1 further comprise:
   receiving a radio frequency signal modulated to carry the packet;
   determining a received signal strength indicator (RSSI) of the radio frequency signal to produce an RSSI, wherein the RSSI corresponds to the signal strength;
   converting the radio frequency signal into a baseband signal;
   demodulating the baseband signal to recapture data;
   computing the decoding error information of the recaptured data;
   generating the second power level to be greater than the first power level when the RSSI is less than a lower threshold of a range of acceptable RSSI or when the decoding error information is less than a lower error rate threshold of the range of acceptable error rates; and
   generating the second power level to be less than the first power level when the RSSI is greater than an upper threshold of the range of acceptable RSSI or when the decoding error information is greater than an upper error rate threshold of the range of acceptable error rates.

4. The method of claim 1 further comprises:
   providing, by the transmitting wireless device, an acknowledgement of receipt of the second power level to the targeted wireless device; and
   providing, by the transmitting wireless device, an indication of power level adjustment from the first power level to the second power level to the targeted wireless device.

5. The method of claim 1 further comprises:
   transmitting, by a station as the transmitting wireless device, the packet to an access point via a wireless channel at a first power level within an 802.11 wireless network;
   determining, by the access point as the targeted wireless device, the signal strength of the packet, the decoding error information, and the second power level.

6. The method of claim 1 further comprises:
   transmitting, by an access point as the transmitting wireless device, the packet to a station via a wireless channel at a first power level within an 802.11 wireless network;
   determining, by the station as the targeted wireless device, the signal strength of the packet, the decoding error information, and the second power level.

7. A method for transmit power control of transmitting wireless device, the method comprises:
   transmitting, by the transmitting wireless device, a packet to a targeted wireless device via a wireless channel at a first power level;
   determining, by the targeted wireless device, signal strength of the packet received via the wireless channel to produce a determined signal strength;
   transmitting, by the targeted wireless device, the determined signal strength of the packet to transmitting wireless device and transmitting a request for a transmitted power level,
   determining, by the transmitting wireless device, adequacy of the first power level based on the determined signal strength;
   when the first power level is not adequate, determining, by the transmitting wireless device, a second power level for the transmitting wireless device based on the determination of the adequacy of the first power level; and
   adjusting, by the transmitting wireless device, transmit power from the first power level to the second power level when the first power level is not adequate.

8. The method of claim 7, wherein the determining the signal strength, determining the adequacy of the first power level, and determining the second power level further comprise:

receiving, by the targeted wireless device, a radio frequency signal modulated to carry the packet;
determining, by the targeted wireless device, received signal strength indicator (RSSI) of the radio frequency signal to produce an RSSI;
converting, by the targeted wireless device, the radio frequency signal into a baseband signal;
demodulating, by the targeted wireless device, the baseband signal to recapture data;
computing, by the targeted wireless device, accuracy of the recaptured data;
separating, by the targeted wireless device, the recaptured data to isolate the indicated power level of transmission from data;
providing, by the targeted wireless device, the RSSI and the accuracy of the recaptured data to the transmitting wireless device;
analyzing, by the transmitting wireless device, the RSSI and the accuracy of the recaptured data to produce the adequacy of the first power level;
generating, by the transmitting wireless device, the second power level to be greater than the first power level when the RSSI or accuracy of the recaptured data are below corresponding minimum performance thresholds; and
generating, by the transmitting wireless device, the second power level to be less than the first power level when the RSSI and the accuracy of the recaptured data are above acceptable performance thresholds.

9. The method of claim 7 further comprises:
providing, by the transmitting wireless device, an indication of power level adjustment from the first power level to the second power level to the targeted wireless device.

10. The method of claim 7 further comprises:
transmitting, by a station as the transmitting wireless device, the packet to an access point via a wireless channel at a first power level within an 802.11 wireless network;
determining, by the access point as the targeted wireless device, the signal strength of the packet and the adequacy of the first power level; and
determining, by the station, the second power level when the first power level is not adequate.

11. The method of claim 7 further comprises:
transmitting, by an access point as the transmitting wireless device, the packet to a station via a wireless channel at a first power level within an 802.11 wireless network;
determining, by the station as the targeted wireless device, the signal strength of the packet and the adequacy of the first power level; and
determining, by the access point, the second power level when the first power level is not adequate.

12. A wireless communication network that includes a plurality of basic service sets, wherein each of the plurality of basic service sets comprises:
access point (AP); and
plurality of stations, wherein the access point includes an AP processing module and AP memory, wherein the AP memory includes operational instructions that cause the AP processing module to:
receive a packet from one of the plurality of stations a wireless channel at a first power level;
determine signal strength and decoding error information of the packet received via the wireless channel;
determine whether the signal strength is with an acceptable range of signal strengths;
determine whether the decoding error information is within an acceptable range of error codes;
transmit a packet indicating signal strength for the received packet to the one of the plurality of stations via the wireless channel; and
wherein each of the plurality of stations (STA) includes a STA processing module and STA memory, wherein the STA memory includes operational instructions that cause the STA processing module to:
transmit the packet to the access point via the wireless channel at the first power level to request a transmitted power level for a previous packet;
provide an acknowledgement of receipt of the second power level to the access point; and
provide an indication of power level adjustment from the first power level to the second power level to the access point.

13. The wireless communication network of claim 12, wherein the STA memory further comprises operational instructions that cause the one of the plurality of stations to transmit the packet by:
transmitting the packet to include an indicated power level of transmission to identify the first power level.

14. The wireless communication network of claim 13, wherein the access point further comprises:
radio receiver operably coupled to receive a radio frequency signal modulated to carry the packet, wherein the radio receiver determines received signal strength indicator (RSSI) of the radio frequency signal to produce an RSSI, converts the radio frequency signal into a baseband signal, and demodulates the baseband signal to recapture data;
wherein the AP memory further includes operational instructions that cause the access point to:
compute the decoding error information of the recaptured data;
generating the second power level to be greater than the first power level when the RSSI is less than a lower threshold of a range of acceptable RSSI or when the decoding error information is less than a lower error rate threshold of the range of acceptable error rates; and
generating the second power level to be less than the first power level when the RSSI is greater than an upper threshold of the range of acceptable RSSI or when the decoding error information is greater than an upper error rate threshold of the range of acceptable error rates.

15. The wireless communication network of claim 13, wherein the one of the plurality of stations further comprises:
radio receiver operably coupled to receive a second radio frequency signal modulated to carry the second packet, wherein the radio receiver determines received signal strength indicator (RSSI) of the second radio frequency signal to produce second RSSI, converts the second radio frequency signal into a second baseband signal, and demodulates the second baseband signal to recapture second data;
wherein the STA memory further includes operational instructions that cause the one of the plurality of stations to determine the adequacy of the third power level and determine the fourth power level by:
computing accuracy of the recaptured second data;
separating the recaptured second data to isolate the indicated power level of transmission from data;

analyzing the second RSSI and the accuracy of the recaptured second data to produce the adequacy of the third power level;
generating the fourth power level to be greater than the third power level when the second RSSI or the accuracy of the recaptured second data are below corresponding minimum performance thresholds; and
generating the fourth power level to be less than the third power level when the second RSSI and the accuracy of the recaptured second data are above acceptable performance thresholds.

16. The wireless communication network of claim 12, wherein the STA memory further comprises operational instructions that cause the STA processing module of the one of the plurality of stations to:
receive a second packet from the access point via the wireless channel at a third power level;
determine signal strength of the second packet received via the wireless channel to produce a second determined signal strength;
determine adequacy of the third power level based on the second determined signal strength;
determine a fourth power level for the access point based on the determination of the adequacy of the third power level when the third power level is not adequate; and
transmit a packet indicating the fourth power level to the access point via the wireless channel; and
wherein AP memory further includes operational instructions that cause the AP processing module to:
transmit the second packet to the one of the plurality of stations via the wireless channel at the third power level;
provide an acknowledgement of receipt of the fourth power level to the one of the plurality of stations; and
provide an indication of power level adjustment from the third power level to the fourth power level to the one of the plurality of stations.

17. The wireless communication network of claim 16, wherein the AP memory further comprises operational instructions that cause the AP processing module to transmit the packet by:
transmitting the second packet to include an indicated power level of transmission to indicate the third power level.

18. The wireless communication network of claim 16, wherein the one of the plurality of stations further comprises:
radio transmitter operably coupled to transmit a request for identifying the third power level to the access point;
radio receiver operably coupled to receive a second radio frequency signal modulated to carry the second packet and the indication of the third power level, wherein the radio receiver determines received signal strength indicator (RSSI) of the radio frequency signal to produce second RSSI, converts the second radio frequency signal into a second baseband signal, and demodulates the second baseband signal to recapture second data;
wherein the STA memory further includes operational instructions that cause the one of the plurality of stations to determine the adequacy of the third power level and determine the fourth power level by:
computing accuracy of the recaptured second data;
separating the recaptured second data to isolate the indicated power level of transmission from data;
analyzing the second RSSI and the accuracy of the recaptured second data to produce the adequacy of the third power level;
generating the fourth power level to be greater than the third power level when the second RSSI or the accuracy of the recaptured second data are below corresponding minimum performance thresholds; and
generating the fourth power level to be less than the third power level when the second RSSI and the accuracy of the recaptured second data are above acceptable performance thresholds.

19. A wireless communication network that includes a plurality of basic service sets, wherein each of the plurality of basic service sets comprises:
access point (AP); and
plurality of stations, wherein the access point includes
an AP processing module and AP memory, wherein the AP memory includes operational instructions that cause the AP processing module to:
receive a packet from one of the plurality of stations via a wireless channel at a first power level;
determine signal strength of the packet received via the wireless channel to produce a determined signal strength;
transmit the determined signal strength of the packet to the one of the plurality of stations;
wherein each of the plurality of stations (STA) includes a STA processing module and STA memory, wherein the STA memory includes operational instructions that cause the STA processing module to:
transmit the packet to the access point via a wireless channel at the first power level requesting a transmitted power level for a previously transmitted packet;
determine adequacy of the first power level based on the determined signal strength;
determine a second power level based on the determination of the adequacy of the first power level when the first power level is not adequate; and
adjust transmit power from the first power level to the second power level when the first power level is not adequate.

20. The wireless communication network of claim 19, wherein the access point further comprises:
radio receiver operably coupled to receive a radio frequency signal modulated to carry the packet, wherein the radio receiver determines received signal strength indicator (RSSI) of the radio frequency signal to produce an RSSI, converts the radio frequency signal into a baseband signal, and demodulates the baseband signal to recapture data;
wherein the AP memory further includes operational instructions that cause the access point to determine the adequacy of the first power level by:
computing accuracy of the recaptured data;
providing the RSSI and the accuracy of the recaptured data to the transmitting wireless device;
wherein the STA memory further includes operational instructions that cause the STA processor to determine the adequacy of the first power level and to determine the second power level by:
analyzing the RSSI and the accuracy of the recaptured data to produce the adequacy of the first power level;
generating the second power level to be greater than the first power level when the RSSI or accuracy of the recaptured data are below corresponding minimum performance thresholds; and generating the second power level to be less than the first power level when the RSSI and the accuracy of the recaptured data are above acceptable performance thresholds.

21. The wireless communication network of claim 19, wherein the STA memory further comprises operational instructions that cause the STA processing module to:
provide an indication of power level adjustment from the first power level to the second power level to the access point.

22. A station for use in a wireless communication network, the station (STA) comprises:
a STA processing module; and
STA memory operably coupled to the STA processing module, wherein the STA memory includes operational instructions that cause the STA processing module to:
receive a packet from an access point via a wireless channel at a first power level;
determine signal strength and decoding error information of the packet received via the wireless channel;
determine whether the signal strength is within an acceptable range of signal strengths;
determine whether the decoding error information is within an acceptable range of error rates; and
transmit a packet indicating the determined signal strength for the received packet to the access point via the wireless channel and requesting transmission of a previously transmitted power level.

23. The station of claim 22, wherein the STA memory further comprises operational instructions that cause the STA processing module to:
compute the decoding error information accuracy of the recaptured data;
generating the second power level to be greater than the first power level when the RSSI is less than a lower threshold of a range of acceptable RSSI or when the decoding error information is less than a lower error rate threshold of the range of acceptable error rates; and
generating the second power level to be less than the first power level when the RSSI is greater than an upper threshold of the range of acceptable RSSI or when the decoding error information is greater than an upper error rate threshold of the range of acceptable error rates.

24. An access point for use in a wireless communication network, the access point (AP) comprises:
an AP processing module; and
AP memory operably coupled to the AP processing module, wherein the AP memory includes operational instructions that cause the AP processing module to:
receive a packet from one of a plurality of stations of the wireless communication network via a wireless channel at a first power level;
determine signal strength and decoding error information of the packet received via the wireless channel;
determine whether the signal strength is within an acceptable range of signal strengths;
determine whether the decoding error information is within an acceptable range of error rates;
transmit a packet indicating the determined signal strength of the received packet to the one of the plurality of stations via the wireless channel and requesting transmission of a previously transmitted power level.

25. The access point of claim 24 further comprises:
radio receiver operably coupled to receive a radio frequency signal modulated to carry the packet, wherein the radio receiver determines received signal strength indicator (RSSI) of the radio frequency signal to produce an RSSI, converts the radio frequency signal into a baseband signal, and demodulates the baseband signal to recapture data;
wherein the AP memory further includes operational instructions that cause the access point to:
compute the decoding error information accuracy of the recaptured data;
generating the second power level to be greater than the first power level when the RSSI is less than a lower threshold of a range of acceptable RSSI or when the decoding error information is less than a lower error rate threshold of the range of acceptable error rates; and
generating the second power level to be less than the first power level when the RSSI is greater than an upper threshold of the range of acceptable RSSI or when the decoding error information is greater than an upper error rate threshold of the range of acceptable error rates.

26. The access point of claim 24, wherein the AP memory further comprises operational instructions that cause the AP processing module to:
transmit a second packet to the one of the plurality of stations via the wireless channel at the third power level;
provide an acknowledgement of receipt of the fourth power level to the one of the plurality of stations; and
provide an indication of power level adjustment from the third power level to the fourth power level to the one of the plurality of stations.

27. A station for use in a wireless communication network, the station (STA) comprises:
a STA processing module; and
STA memory operably coupled to the STA processing module, wherein the STA memory includes operational instructions that cause the STA processing module to:
transmit a packet to an access point of the wireless communication network via a wireless channel at the first power level requesting transmission of a previously transmitted power level;
determine adequacy of the first power level based on a determined signal strength received from the access point;
determine a second power level based on the determination of the adequacy of the first power level when the first power level is not adequate; and
adjust transmit power from the first power level to the second power level when the first power level is not adequate.

28. The station of claim 27, wherein the STA memory further comprises operational instructions that cause the STA processor to determine the adequacy of the first power level and to determine the second power level by:
receiving received signal strength indicator (RSSI) and accuracy of the recaptured data from the access point;
analyzing RSSI and the accuracy of the recaptured data to produce the adequacy of the first power level;
generating the second power level to be greater than the first power level when the RSSI or accuracy of the recaptured data are below corresponding minimum performance thresholds; and generating the second power level to be less than the first power level when the RSSI and the accuracy of the recaptured data are above acceptable performance thresholds.

29. The station of claim 27, wherein the STA memory further comprises operational instructions that cause the STA processing module to:

provide an indication of power level adjustment from the first power level to the second power level to the access point.

* * * * *